US008989255B2

(12) United States Patent
Mito et al.

(10) Patent No.: US 8,989,255 B2
(45) Date of Patent: Mar. 24, 2015

(54) CONTENT RECEPTION APPARATUS AND CONTENT RECEPTION APPARATUS CONTROL METHOD

(75) Inventors: Koji Mito, Kawasaki (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 12/900,418

(22) Filed: Oct. 7, 2010

(65) Prior Publication Data

US 2011/0116552 A1    May 19, 2011

(30) Foreign Application Priority Data

Nov. 18, 2009   (JP) .................................. 2009-263073

(51) Int. Cl.
H04B 1/66       (2006.01)
H04N 19/61      (2014.01)
H04N 19/44      (2014.01)
H04N 19/46      (2014.01)
H04N 19/33      (2014.01)

(52) U.S. Cl.
CPC ... *H04N 19/00781* (2013.01); *H04N 19/00533* (2013.01); *H04N 19/00545* (2013.01); *H04N 19/00436* (2013.01)
USPC ......................................................... 375/240

(58) Field of Classification Search
CPC .................. H04N 19/00436; H04N 19/00533; H04N 19/00545; H04N 19/00781
USPC ......................................................... 375/240
See application file for complete search history.

(56) References Cited

U.S. PATENT DOCUMENTS

| 5,995,707 | A | * | 11/1999 | Lee | ................................ 386/314 |
| 6,854,127 | B1 | * | 2/2005 | Kanemitsu | ....................... 725/58 |
| 2002/0107850 | A1 | * | 8/2002 | Sugimoto et al. | .................. 707/3 |
| 2003/0206717 | A1 | * | 11/2003 | Yogeshwar et al. | ............. 386/69 |
| 2005/0123055 | A1 | * | 6/2005 | Winger | ..................... 375/240.25 |
| 2005/0203927 | A1 | * | 9/2005 | Sull et al. | ....................... 707/100 |
| 2006/0064716 | A1 | * | 3/2006 | Sull et al. | ......................... 725/37 |
| 2006/0064734 | A1 | * | 3/2006 | Ma | ................................. 725/136 |
| 2006/0133482 | A1 | * | 6/2006 | Park et al. | ................ 375/240.08 |

(Continued)

FOREIGN PATENT DOCUMENTS

| JP | 2007-116603 A | 5/2007 |
| JP | 2009-060567 A | 3/2009 |
| JP | 2009-065635 A | 3/2009 |

OTHER PUBLICATIONS

ISO, ISO/IEC 14496-10; Oct. 1, 2004, ISO/IEC, Second Edition, pp. i-vii, and 247-253.*

*Primary Examiner* — Sath V Perungavoor
*Assistant Examiner* — Peter D Le
(74) *Attorney, Agent, or Firm* — Canon USA, Inc., IP Division

(57) ABSTRACT

A content reception apparatus includes a decoding unit configured to decode coded video data including a plurality of layers and generate video data of each layer, an acquisition unit configured to acquire content information associated with the video data of each layer, an extraction unit configured to compare content information corresponding to each of the plurality of layers and extract content information different from each of the plurality of layers as content difference information, and a control unit configured to generate a content information display screen that displays the content information associated with video data of each layer decoded by the decoding unit on a display unit.

6 Claims, 16 Drawing Sheets

(56) References Cited

U.S. PATENT DOCUMENTS

| | | | |
|---|---|---|---|
| 2007/0074266 A1* | 3/2007 | Raveendran et al. | 725/135 |
| 2007/0081586 A1* | 4/2007 | Raveendran et al. | 375/240.1 |
| 2007/0081587 A1* | 4/2007 | Raveendran et al. | 375/240.1 |
| 2007/0121678 A1* | 5/2007 | Brooks et al. | 370/505 |
| 2007/0140350 A1* | 6/2007 | Sakazume et al. | 375/240.21 |
| 2007/0160133 A1* | 7/2007 | Bao et al. | 375/240.1 |
| 2007/0160153 A1* | 7/2007 | Sullivan | 375/240.29 |
| 2007/0265098 A1* | 11/2007 | Shimada et al. | 463/43 |
| 2007/0291847 A1* | 12/2007 | Shimauchi et al. | 375/240.16 |
| 2008/0002767 A1* | 1/2008 | Schwarz et al. | 375/240.12 |
| 2008/0007438 A1* | 1/2008 | Segall et al. | 341/61 |
| 2008/0008394 A1* | 1/2008 | Segall | 382/238 |
| 2008/0077965 A1* | 3/2008 | Kamimaki et al. | 725/105 |
| 2008/0259962 A1* | 10/2008 | Mori et al. | 370/498 |
| 2008/0262996 A1* | 10/2008 | Yogeshwar et al. | 707/1 |
| 2009/0010619 A1* | 1/2009 | Kim et al. | 386/124 |
| 2009/0022054 A1* | 1/2009 | Kim et al. | 370/235 |
| 2009/0040315 A1 | 2/2009 | Nakase | |
| 2009/0041129 A1* | 2/2009 | Suh et al. | 375/240.25 |
| 2009/0055875 A1* | 2/2009 | Lee et al. | 725/62 |
| 2009/0077067 A1* | 3/2009 | Takagi | 707/5 |
| 2009/0241162 A1* | 9/2009 | Lee | 725/131 |
| 2009/0316798 A1* | 12/2009 | Mimar | 375/240.26 |
| 2010/0046637 A1* | 2/2010 | Raveendran | 375/240.26 |
| 2010/0150238 A1* | 6/2010 | Watanabe et al. | 375/240.13 |
| 2010/0262708 A1* | 10/2010 | Bouazizi et al. | 709/231 |
| 2012/0203923 A1* | 8/2012 | Shukla et al. | 709/231 |

* cited by examiner

FIG.5

| BROADCAST PROGRAM IDENTIFICATION INFORMATION (200/201) | RESOLUTION LAYER IDENTIFICATION INFORMATION (202) | BROADCAST PROGRAM INFORMATION (203) |
|---|---|---|
| EVENT ID = 1 (BROADCAST PROGRAM A) | LAYER ID = 2 (4K2K RESOLUTION) | CAST A<br>CAST B<br>CAST C<br>CAST D<br>CAST E |
| | LAYER ID = 1 (HD RESOLUTION) | CAST A<br>CAST B<br>CAST C<br>CAST D |
| | LAYER ID = 0 (SD RESOLUTION) | CAST B<br>CAST C<br>CAST D |
| ⋮ | ⋮ | ⋮ |

FIG.6

| 300 BROADCAST PROGRAM IDENTIFICATION INFORMATION | 301 CURRENT TARGET RESOLUTION LAYER IDENTIFICATION INFORMATION | 303 OTHER RESOLUTION LAYER IDENTIFICATION INFORMATION | 304 BROADCAST PROGRAM DIFFERENCE INFORMATION |
|---|---|---|---|
| EVENT ID = 1 (BROADCAST PROGRAM A) | LAYER ID = 2 (4K2K RESOLUTION) | LAYER ID = 1 (HD RESOLUTION) | — |
| | | LAYER ID = 0 (SD RESOLUTION) | — |
| | LAYER ID = 1 (HD RESOLUTION) | LAYER ID = 2 (4K2K RESOLUTION) | CAST E |
| | | LAYER ID = 0 (SD RESOLUTION) | — |
| | LAYER ID = 0 (SD RESOLUTION) | LAYER ID = 2 (4K2K RESOLUTION) | CAST A CAST E |
| | | LAYER ID = 1 (HD RESOLUTION) | CAST A |
| ⋮ | ⋮ | ⋮ | ⋮ |

(Column 302 labels the CURRENT TARGET RESOLUTION LAYER IDENTIFICATION INFORMATION header position.)

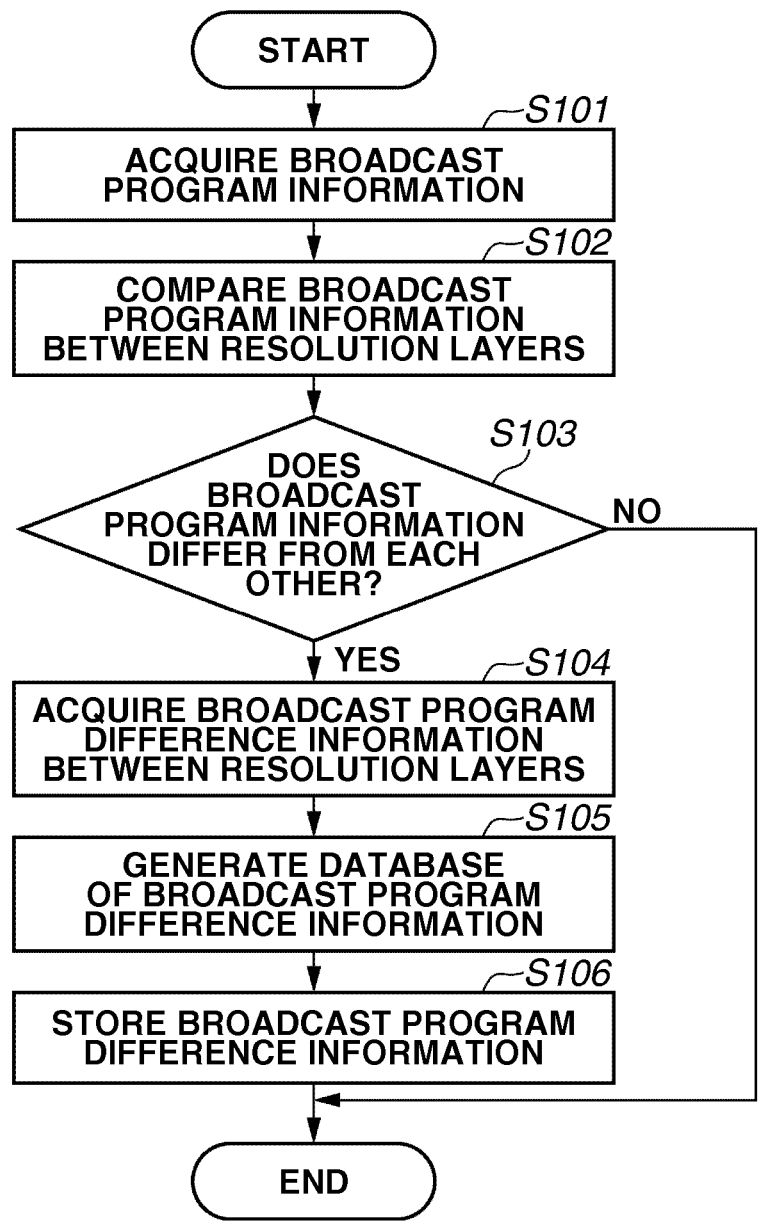

FIG.12

| SCENE IDENTIFICATION INFORMATION (500) | START TIME (501) | RESOLUTION LAYER IDENTIFICATION INFORMATION (502) | BROADCAST PROGRAM INFORMATION (503) |
|---|---|---|---|
| SCENE ID = 1 (SCENE A) | 8:30 p.m. | LAYER ID = 2 (4K2K RESOLUTION) | CAST A<br>CAST B<br>CAST C<br>CAST D<br>CAST E |
| | | LAYER ID = 1 (HD RESOLUTION) | CAST A<br>CAST B<br>CAST C<br>CAST D |
| | | LAYER ID = 0 (SD RESOLUTION) | CAST B<br>CAST C<br>CAST D |
| SCENE ID = 2 (SCENE A) | 8:40 p.m. | LAYER ID = 2 (4K2K RESOLUTION) | CAST V<br>CAST W<br>CAST X<br>CAST Y<br>CAST Z |
| | | LAYER ID = 1 (HD RESOLUTION) | CAST V<br>CAST W<br>CAST X<br>CAST Y |
| | | LAYER ID = 0 (SD RESOLUTION) | CAST V<br>CAST W<br>CAST X |
| ⋮ | ⋮ | ⋮ | ⋮ |

FIG.13

| SCENE IDENTIFICATION INFORMATION | CURRENT TARGET RESOLUTION LAYER IDENTIFICATION INFORMATION | OTHER RESOLUTION LAYER IDENTIFICATION INFORMATION | BROADCAST PROGRAM DIFFERENCE INFORMATION |
|---|---|---|---|
| SCENE ID = 1 (SCENE A) | LAYER ID = 2 (4K2K RESOLUTION) | LAYER ID = 1 (HD RESOLUTION) | — |
| | | LAYER ID = 0 (SD RESOLUTION) | — |
| | LAYER ID = 1 (HD RESOLUTION) | LAYER ID = 2 (4K2K RESOLUTION) | CAST E |
| | | LAYER ID = 0 (SD RESOLUTION) | — |
| | LAYER ID = 0 (SD RESOLUTION) | LAYER ID = 2 (4K2K RESOLUTION) | CAST A CAST E |
| | | LAYER ID = 1 (HD RESOLUTION) | CAST A |
| SCENE ID = 2 (SCENE A) | LAYER ID = 2 (4K2K RESOLUTION) | LAYER ID = 1 (HD RESOLUTION) | — |
| | | LAYER ID = 0 (SD RESOLUTION) | — |
| | LAYER ID = 1 (HD RESOLUTION) | LAYER ID = 2 (4K2K RESOLUTION) | CAST Z |
| | | LAYER ID = 0 (SD RESOLUTION) | — |
| | LAYER ID = 0 (SD RESOLUTION) | LAYER ID = 2 (4K2K RESOLUTION) | CAST Y CAST Z |
| | | LAYER ID = 1 (HD RESOLUTION) | CAST Y |
| ⋮ | ⋮ | ⋮ | ⋮ |

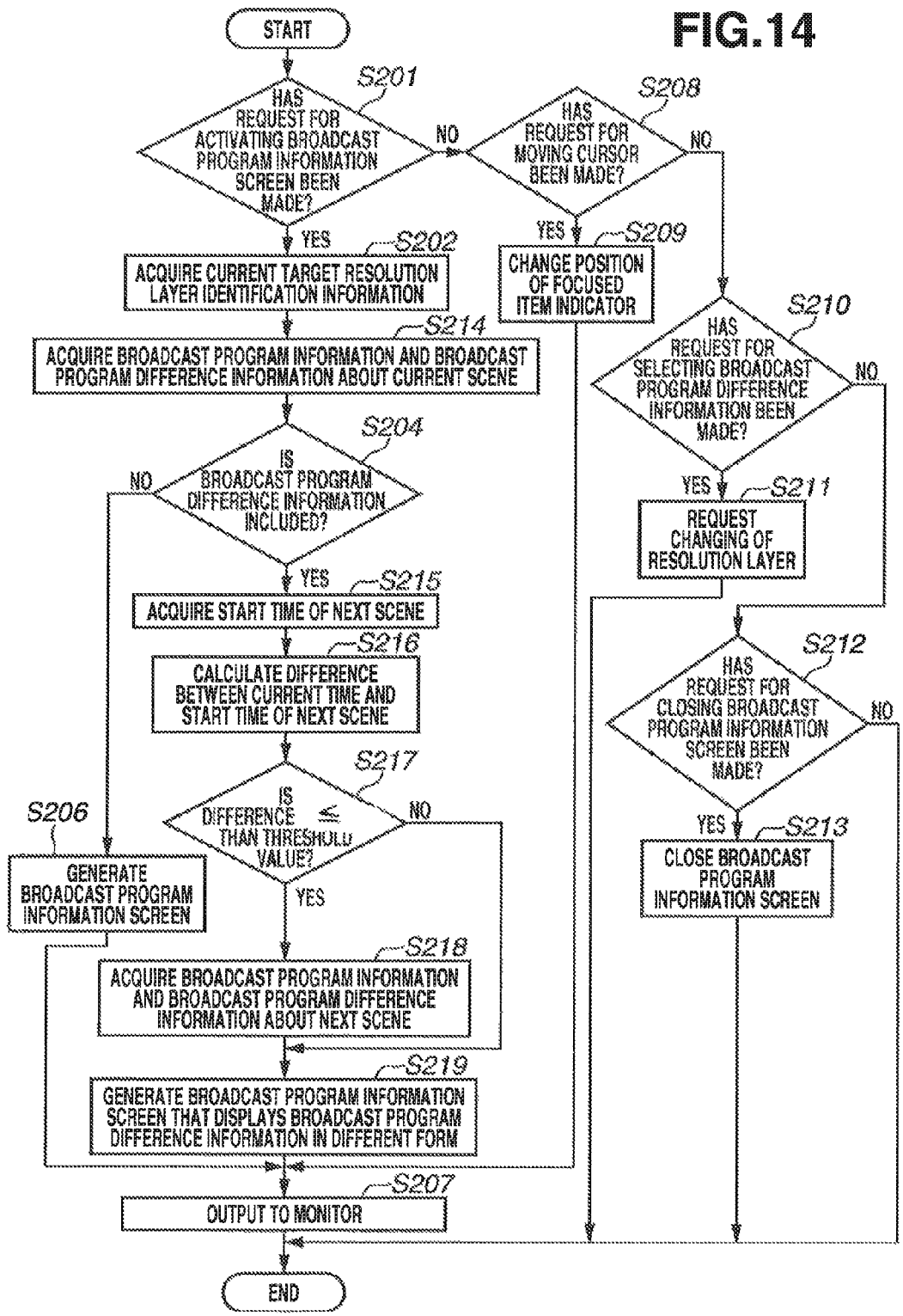

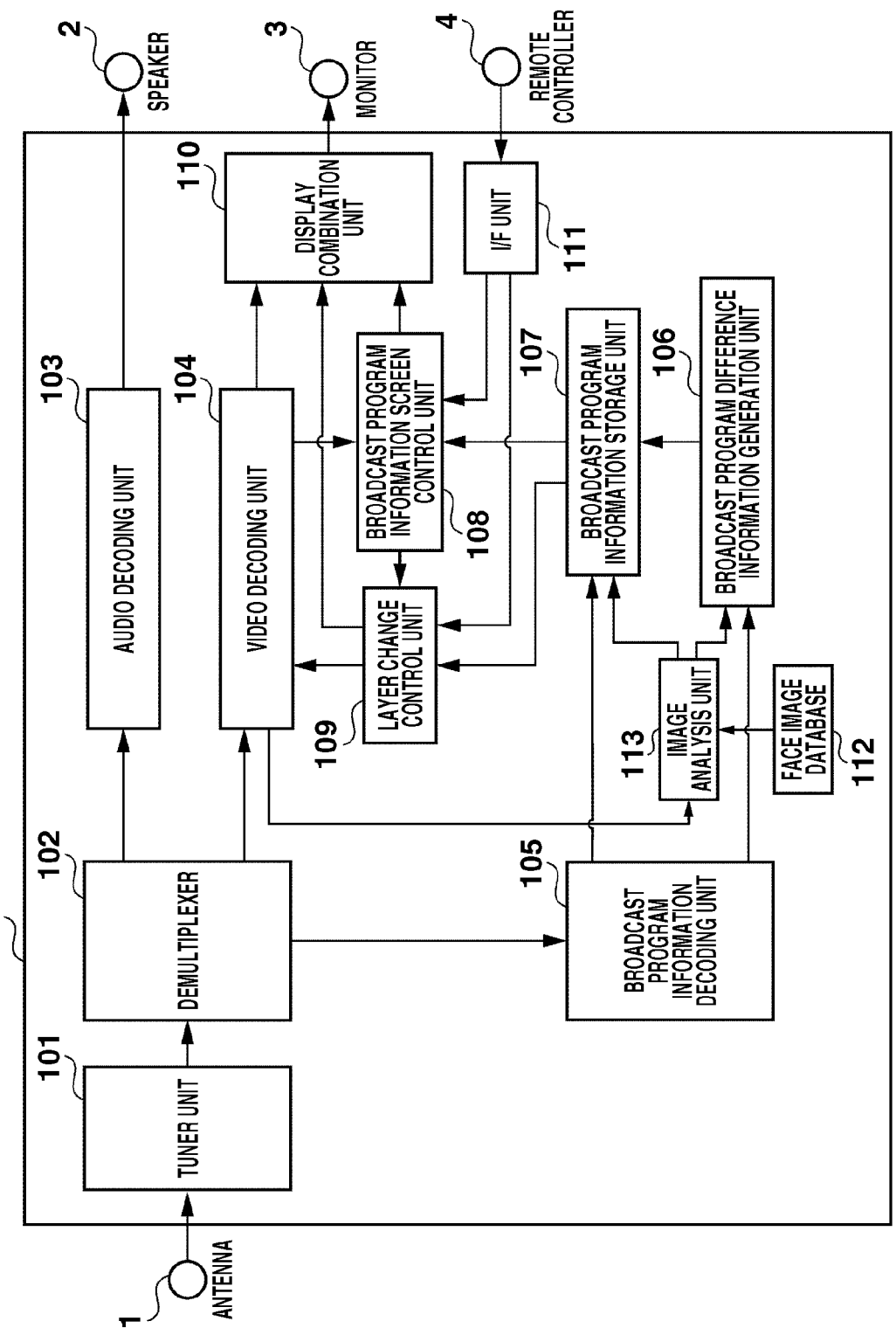

CONTENT RECEPTION APPARATUS AND CONTENT RECEPTION APPARATUS CONTROL METHOD

BACKGROUND OF THE INVENTION

1. Field of the Invention

The present invention relates to a content reception apparatus and a control method therefor capable of changing video content having an angle of view, in video contents having a plurality of angles of view, to another video content having an angle of view selected by selecting content information that has been added for each angle of view.

2. Description of the Related Art

In recent years, a scalable video coding method, such as H.264/Scalable Video Coding (SVC) has been introduced. The H.264 SVC standard, which is an expansion from H.264/Advanced Video Coding (AVC), includes a plurality of resolution layers. In H.264/SVC, by using a combination of resolution layers, a video can be decoded in a plurality of resolutions.

In H.264/SVC, different angles of view can be defined for different resolution layers. Accordingly, when H.264/SVC is used as the method for encoding a video, it is supposed that a creator of the video adds different content information to different resolution layers. A conventional method for adding metadata to each angle of view of an image having a plurality of angles of view has been provided.

A method discussed in Japanese Patent Application Laid-Open No. 2009-065635 executes image analysis, extracts metadata, and adds metadata again to a trimmed image. In addition, if the angle of view has been changed by trimming the image, the method discussed in Japanese Patent Application Laid-Open No. 2009-065635 adds metadata to all angles of view of the image. Accordingly, the conventional method identifies the difference of metadata for each angle of view.

In addition, a conventional method has been studied which, if content information is added to each layer of one video content, presents the content information added to each layer.

A method discussed in Japanese Patent Application Laid-Open No. 2007-116603, if one video content includes a plurality of layers, acquires detailed content information from a layer other than the layer whose corresponding video is currently displayed, and displays the acquired content information to a user.

However, the above-described conventional method does not discuss a method for allowing a user to select content information about a layer other than a layer whose video is currently being viewed and for switching to a video corresponding to the layer including the selected content information.

SUMMARY OF THE INVENTION

The present invention is directed to a content reception apparatus and a method for controlling the content reception apparatus configured to present a difference between content information of a plurality of layers to a user and allow a user to select one piece of content information from among the plurality of pieces of presented content information and capable of switching to a video corresponding to a layer including the selected content information.

According to an aspect of the present invention, a content reception apparatus includes a content reception apparatus includes a decoding unit configured to decode coded video data including a plurality of layers and generate video data of each layer, an acquisition unit configured to acquire content information associated with the video data of each layer, an extraction unit configured to compare content information corresponding to each of the plurality of layers and extract content information different from each of the plurality of layers as content difference information, and a control unit configured to generate a content information display screen that displays the content information associated with video data of each layer decoded by the decoding unit on a display unit. The control unit is configured to determine whether the content information associated with the video data of a first layer of the plurality of layers decoded by the decoding unit is different from the content information associated with video data of a second layer of the plurality of layers decoded by the decoding unit according to the content difference information, and, if it is determined that the content information associated with the video data of the first and second layers differ from one another, to generate the content information display screen on which the content information associated with the video data of the first decoded layer and the content difference information can be identified from each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 5 is a table illustrating an example of a broadcast program information database, which is managed by a content reception apparatus according to the first and a third exemplary embodiment of the present invention.

FIG. 6 is a table illustrating an example of a broadcast program difference information database, which is managed by the content reception apparatus according to the first and the third exemplary embodiments of the present invention.

FIG. 7 is a flow chart illustrating an example of broadcast program difference information generation processing executed by the content reception apparatus according to the first to the third exemplary embodiments of the present invention.

FIG. 12 is a table illustrating an example of a broadcast program information database, which is managed by a content reception apparatus according to the second exemplary embodiment of the present invention.

FIG. 13 is a table illustrating an example of a broadcast program difference information database, which is managed by the content reception apparatus according to the second exemplary embodiment of the present invention.

FIG. 14 is a flow chart illustrating an example of broadcast program information screen control processing executed by the content reception apparatus according to the second exemplary embodiment of the present invention.

FIG. 16 illustrates an exemplary configuration of the content reception apparatus according to the third exemplary embodiment of the present invention.

DESCRIPTION OF THE EMBODIMENTS

Various exemplary embodiments, features, and aspects of the invention will be described in detail below with reference to the drawings.

An exemplary configuration of a video coding method according to H.264/SVC, which is applied to a first exemplary embodiment of the present invention, will be described in detail below with reference in FIG. 1.

Figure 1:
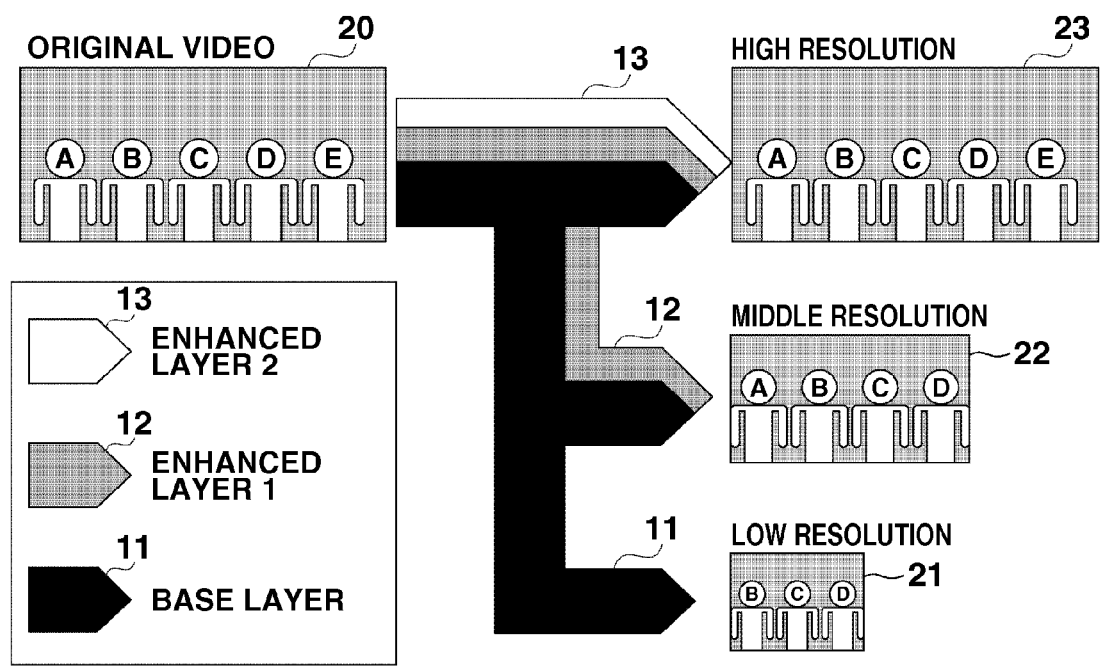
FIG. 1 illustrates an example of a space scalability in H.264/SVC according to an exemplary embodiment of the present invention.

Referring to FIG. 1, an H.264/SVC content 20 includes a plurality of resolution layers corresponding to a plurality of layer structures. A resolution layer largely includes two types of layers, i.e., a base layer 11 and enhanced layers 12 and 13. By using a combination of the base layer 11 and the enhanced layers 12 and 13, it is enabled to decode a video at a plurality of resolutions as illustrated in FIG. 1 by decoded videos 21 through 23. More specifically, in the present exemplary embodiment, the decoded video 21, which is decoded by decoding the base layer 11 only, has a low resolution. Furthermore, the decoded videos 22 and 23, which are decoded by decoding the enhanced layers 12 and 13 as well as the base layer 11, have a high resolution.

In H.264/SVC according to the present exemplary embodiment, a video is decoded by three types of resolution layers, i.e., a standard definition (SD) layer, a high definition (HD) layer, and a 4K-2K layer. If the base layer 11 only is decoded, the decoded video 21 of the SD resolution is generated. If the base layer 11 and the enhanced layer 12 are decoded, the decoded video 22 of the HD resolution is generated. Furthermore, If the base layer 11 and the enhanced layers 12 and 13 are decoded, the decoded video of the 4K-2K resolution is generated.

In other words, video data can be provided with an arbitrary resolution according to which layer is to be decoded. The "4K-2K" resolution is a pixel resolution of 2,160 pixels vertical×4,096 pixels horizontal. The "HD" resolution is a pixel resolution of 1,080 pixels vertical×1,920 pixels horizontal. The "SD" resolution is a pixel resolution of 480 pixels vertical×640 pixels horizontal.

Now, a difference in the angles of view set to a plurality of resolution layers of H.264/SVC according to the present exemplary embodiment of the present invention will be described in detail below with reference in FIG. 2.

In H.264/SVC, a position of offset at a left, right, top, or bottom frame edge point of the decoded videos 22 and 23 of the enhanced layers 12 and 13 from each corresponding frame edge point of the decoded video 21 of the base layer 11 illustrated in FIG. 1 can be defined. Accordingly, as illustrated in FIG. 2, different angles of view can be defined for an angle of view 31 of a decoded video corresponding to the base layer 11 and angles of view 32 and 33 of the decoded video corresponding to the enhanced layers 12 and 13.

The position of offset at the frame edge point is defined by a sequence parameter set, which includes information about encoding of the entire sequence, and a prefix network abstraction layer (NAL) unit, which includes information about encoding of a slice.

As described above, in H.264/SVC according to the present exemplary embodiment, the angle of view can be differently set according to the difference in a combination of the resolution layer to be decoded. Accordingly, different information about a person displayed in the decoded video differs among decoded videos 21 through 23.

Figure 3:
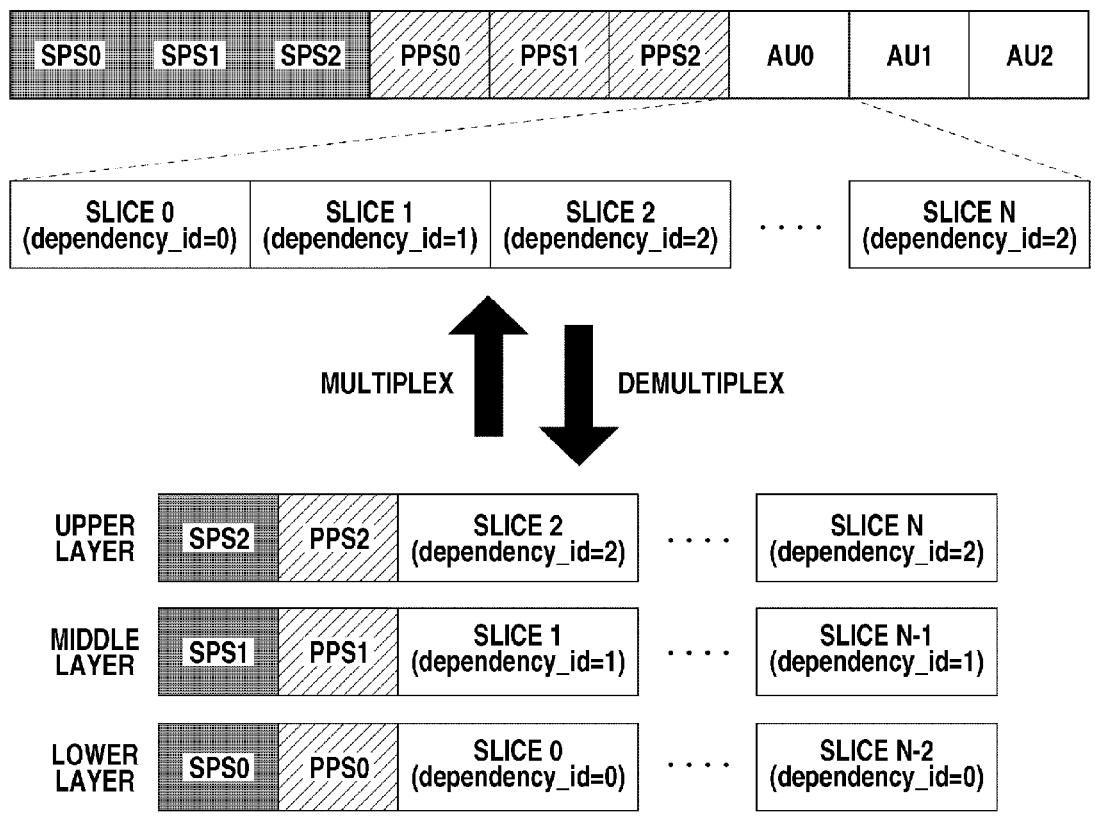
FIG. 3 illustrates an example of a structure of bit stream data in H.264/SVC according to an exemplary embodiment of the present invention.

Now, an example of a structure of bit stream data according to H.264/SVC will be described in detail below with reference to FIG. 3. In H.264/SVC, a sequence parameter set (SPS), a picture parameter set (PPS), and an access unit (AU) are provided in this order. The AU includes a plurality of slices.

An SPS is a header that includes information about encoding of the entire sequence including a plurality of pictures. A PPS is a header including information about encoding of all the pictures.

An AU is data including an aggregate of a plurality of pieces of slice data. Slice data is one type of unit data, which is referred to as "NAL" data that includes an aggregate of coded slice data. An NAL unit includes an NAL header. The type of an NAL unit can be identified according to an NAL unit number, which is defined in the NAL header.

In H.264/SVC, immediately before slice data, expanded header information "prefix NAL unit" is provided in addition to the NAL header. A prefix NAL unit includes a description "dependency_id", which is used for identifying a resolution layer. The same dependency_id is added to the same resolution layer. Accordingly, by referring to the device ID, a resolution layer can be added or deleted. With the above-described configuration, a content reception apparatus 100 according to the present exemplary embodiment is capable of allowing a user to select the resolution to be decoded.

Now, an exemplary configuration of the content reception apparatus 100 according to the present exemplary embodiment will be described in detail below with reference to FIG. 4. In each exemplary embodiment described below, it is supposed that the content reception apparatus 100 receives a broadcast. For easier understanding, it is supposed that a content received by the content reception apparatus 100 is a broadcast program encoded by H.264/SVC.

Figure 4:
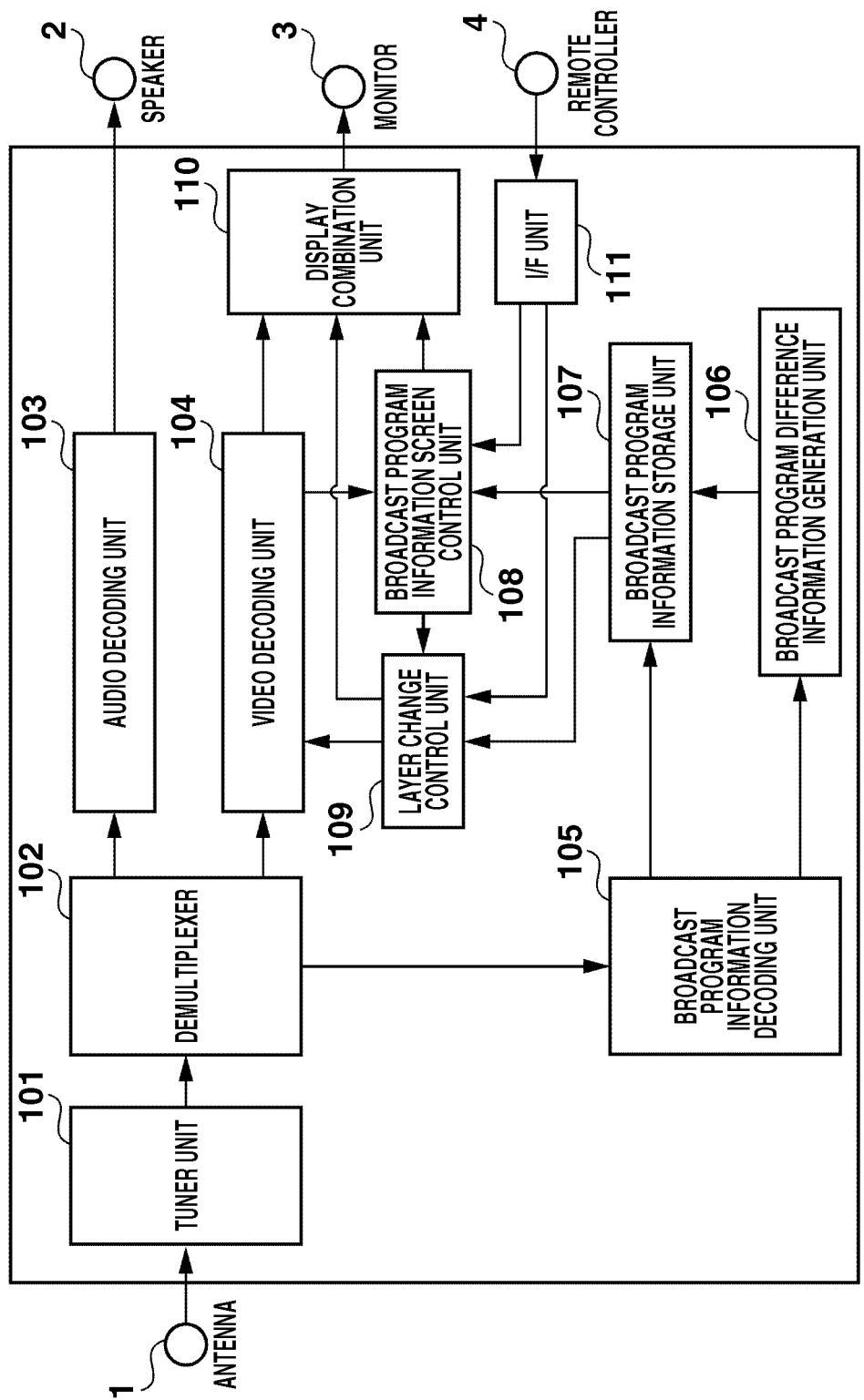
FIG. 4 is a block diagram illustrating an exemplary configuration of a content reception apparatus according to first and second exemplary embodiments of the present invention.

Referring to FIG. 4, a broadcast signal including data of Moving Picture Experts Group (MPEG)-2 Transport Stream (TS) format is input to an antenna 1. In MPEG-2 TS, coded video data encoded by H.264/SVC, coded audio data encoded by Advanced Audio Coding (AAC), and section data is multiplexed. In the section data, broadcast program information (content information) is defined for each resolution layer.

The broadcast signal is input to the tuner unit 101 via the antenna 1. Furthermore, the tuner unit 101 selects a frequency and executes demodulation. Thus, the tuner unit 101 generates data of MPEG-2 TS format. The tuner unit 101 outputs the generated TS data to a demultiplexer 102.

The TS is input to the demultiplexer 102 from the tuner unit 101. The demultiplexer 102 separates the input TS into a video elementary stream (ES), an audio ES, and section data including broadcast program information. The demultiplexer 102 outputs the video ES to the video decoding unit 104, the audio ES to an audio decoding unit 103, and the section data including broadcast program information to a broadcast program information decoding unit 105.

The audio ES encoded by AAC is input to the audio decoding unit 103 by the demultiplexer 102. The audio decoding unit 103 decodes the input audio ES to generate audio data. Furthermore, the audio decoding unit 103 outputs the generated audio data to a speaker 2.

The video ES encoded by H.264/SVC is input to the video decoding unit 104 by the demultiplexer 102. The video decoding unit 104 decodes the input video ES to generate video data. Furthermore, the video decoding unit 104 outputs the generated video data to a display combination unit 110. The display combination unit 110 will be described in detail below. In decoding by the video decoding unit 104, the user selects a resolution layer to be decoded (hereinafter simply referred to as a "decode target resolution layer").

In H.264/SVC, the user can select a resolution layer to be decoded by referring to and according to a dependency_id (hereinafter simply referred to as a "layer ID"). In the present exemplary embodiment, a layer ID is described in the prefix NAL unit, which is expanded header information of slice data. The resolution layer to be decoded is selected according to a request from a layer change control unit 109, which will be described below.

When a request for changing the resolution layer to be decoded is made from the layer change control unit 109, the video decoding unit 104 acquires, from the layer change control unit 109, a layer ID of the resolution layer that is a target of the change. The video decoding unit 104 changes the resolution layer to be decoded by decoding slice data designated by the acquired layer ID, of the video ES encoded by H.264/SVC input by the demultiplexer 102.

In addition, the video decoding unit 104 notifies the decode target resolution layer according to a request from a broadcast program information screen control unit 108, which will be described in detail below.

The section data is input to the broadcast program information decoding unit 105 from the demultiplexer 102. The broadcast program information decoding unit 105 acquires broadcast program information, which is associated with each resolution layer, from the input section data. In addition, the broadcast program information decoding unit 105 generates a broadcast program information database based on the acquired broadcast program information. Furthermore, the broadcast program information decoding unit 105 outputs the generated broadcast program information database to a broadcast program information storage unit 107. The broadcast program information database generated by the broadcast program information decoding unit 105 will be described in detail below with reference in FIG. 5.

The broadcast program difference information generation unit 106 mutually compares text strings of the broadcast program information of all the resolution layers, which is input by the broadcast program information decoding unit 105, to extract the difference of the character strings of the broadcast program information between the resolution layers as the broadcast program difference information (i.e., content difference information).

The broadcast program difference information generation unit 106 generates a broadcast program difference information database based on extracted broadcast program difference information. Furthermore, the broadcast program difference information generation unit 106 outputs the generated broadcast program difference information database to the broadcast program information storage unit 107. The broadcast program difference information database, which is generated by the broadcast program difference information generation unit 106, will be described in detail below with reference in FIG. 6. The broadcast program difference information generation processing, which is executed by the broadcast program difference information generation unit 106, will be described in detail below with reference in FIG. 7.

The broadcast program information storage unit 107 stores the broadcast program information input by the broadcast program information decoding unit 105. In addition, the broadcast program information storage unit 107 stores the broadcast program difference information input by the broadcast program difference information generation unit 106.

The broadcast program information screen control unit 108 generates a broadcast program information screen (content information display screen) based on the broadcast program information and the broadcast program difference information acquired from the broadcast program information storage unit 107, and outputs the generated broadcast program information screen to the display combination unit 110 according to a request for activating the broadcast program information screen given by an I/F unit 111, which will be described in detail below. In addition, the broadcast program information screen control unit 108 closes the broadcast program information screen. The broadcast program information screen control processing executed by the broadcast program information screen control unit 108 will be described in detail below with reference in FIG. 8.

The layer change control unit 109 requests the change of the resolution layer to the video decoding unit 104 according to a request from the broadcast program information screen control unit 108. More specifically, the layer change control unit 109 acquires the broadcast program difference information from the broadcast program information screen control unit 108. Furthermore, the layer change control unit 109 acquires identification information for the resolution layer including the acquired broadcast program difference information from the broadcast program information storage unit 107.

If a plurality of resolution layers including the broadcast program difference information acquired from the broadcast program information screen control unit 108 exists, the layer change control unit 109 generates a resolution layer selection screen, and outputs the generated resolution layer selection screen to the display combination unit 110. After outputting the resolution layer selection screen to the display combination unit 110, the layer change control unit 109 selects a resolution layer according to a request from the I/F unit 111. The layer change control processing executed by the layer change control unit 109 will be described in detail below with reference in FIG. 10.

The display combination unit 110 combines the video data input by the video decoding unit 104 and the broadcast program information screen input by the broadcast program information screen control unit 108 or the resolution layer selection screen input by the layer change control unit 109. In addition, the layer change control unit 109 outputs the combined video data and screen to a monitor (display unit) 3.

The I/F unit 111 gives an instruction to the broadcast program information screen control unit 108 and the layer change control unit 109 according to operation information received from the remote controller 2. More specifically, if operation information input by pressing a cursor up key is received, the I/F unit 111 makes a request for moving the cursor upward.

The table illustrated in FIG. 5 illustrates a broadcast program information database 200 stored on the broadcast program information storage unit 107 of the content reception apparatus 100 illustrated in FIG. 4.

Referring to FIG. 5, broadcast program identification information 201 includes unique information for identifying a broadcast program. More specifically, the broadcast program identification information 201 stores an event_id (event ID), which is described in event information table (EIT) transmitted as service information (SI)

The SI refers to a broadcast program arrangement information. More specifically, SI is digital data including an allocation system, a content, a schedule, and a timing of a broadcast data stream. The EIT, which is one type of information included in the SI, is a table including a broadcast program name and a broadcast date and time.

A resolution layer identification information 202 stores unique information for identifying the resolution layer. More specifically, the resolution layer identification information 202 stores the layer ID described in the prefix NAL unit in the data coded by H.264/SVC as the resolution layer identification information 202.

Broadcast program information 203 includes a content of the broadcast program identified according to the broadcast program identification information 201. More specifically, a text string that describes a content of an item whose name of an item of an extended format event descriptor in the EIT is "cast" is stored as the broadcast program information 203. Accordingly, the name of a cast of the broadcast program can be acquired.

Alternatively, a text string of a name of a cast can be extracted by morphological analysis as the method discussed in Japanese Patent Application Laid-Open No. 2009-60567.

The table illustrated in FIG. 6 illustrates a broadcast program difference information database 300 stored on the broadcast program information storage unit 107 of the content reception apparatus 100 illustrated in FIG. 4.

Figure 2:
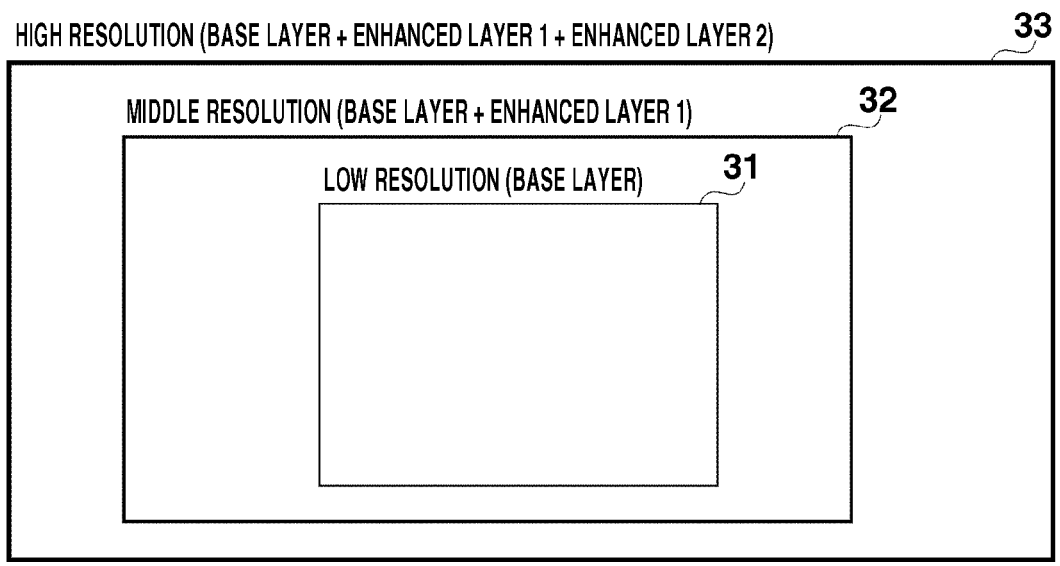
FIG. 2 illustrates a difference in angles of view of resolution layers in H.264/SVC according to an exemplary embodiment of the present invention.

The broadcast program identification information 301 stores an event ID similar to the broadcast program identification information 201 illustrated in FIG. 2. Decode target resolution layer identification information 302 stores a layer ID as the resolution layer identification information for identifying a decode target resolution layer.

Other resolution layer identification information 303 stores a layer ID as resolution layer identification information for identifying a resolution layer other than the decode target resolution layer (hereinafter simply referred to as a "other resolution layer"). If three types of resolution layers, i.e., the SD layer, the HD layer, and the 4K-2K layer exist and if the decode target resolution layer is the SD layer, then the HD and the 4K-2K layers are the other resolution layers.

Broadcast program difference information 304 is broadcast program information that does not exist in the resolution layer identified by the decode target resolution layer identification information 302 but exist in the resolution layer identified by the other resolution layer identification information 303.

In the example illustrated in FIG. 6, broadcast program information that exists in the HD resolution layer (the layer ID=1) but does not exist in the SD resolution layer (the layer ID=0) is "cast A". Accordingly, the "cast A" becomes the broadcast program difference information. A mark "–" described in the broadcast program difference information 304 in FIG. 6 indicates that no broadcast program difference information exists.

An exemplary flow of broadcast program difference information generation processing, which is executed by the broadcast program difference information generation unit 106 (FIG. 4), will be described in detail below with reference to FIG. 7. In the following description, the processing on a specific broadcast program will be described in detail. However, in an actual case, the following processing is repeatedly executed for a number of times equivalent to the number of broadcast programs.

Referring to FIG. 7, in step S101, the broadcast program difference information generation unit 106 acquires the broadcast program information database 200 illustrated in FIG. 5 from the broadcast program information decoding unit 105. In step S102, the broadcast program difference information generation unit 106 compares text strings included in the broadcast program information 203 among resolution layers stored on broadcast program information database 200 and acquired in step S101.

The comparison of the broadcast program information among the resolution layers in step S102 is executed on all the combinations of resolution layers included in the broadcast program. For the broadcast program information database 200 illustrated in FIG. 5, for the SD resolution, the text strings included in the broadcast program information among the resolution layers are mutually compared by using a combination of the HD and 4K-2K resolutions. Similarly, for the HD resolution, the text strings included in the broadcast program information among the resolution layers are mutually compared by using a combination of the SD and the 4K-2K resolutions. Furthermore, for the 4K-2K resolution, the text strings included in the broadcast program information among the resolution layers are mutually compared by using a combination of the SD and the HD resolutions.

In step S103, the broadcast program difference information generation unit 106 determines whether the broadcast program information differs from one another according to a result of the comparison, performed in step S102, among text strings included in the broadcast program information among broadcast programs. If it is determined that the text strings included in the broadcast program information differ from one another among the resolution layers (YES in step S103), then the processing proceeds to step S104. On the other hand, if it is determined that the text strings included in the broadcast program information are the same as one another among the resolution layers (NO in step S103), then the processing ends.

In step S104, the broadcast program difference information generation unit 106 acquires the difference of the broadcast program information among all the resolution layers included in the broadcast program. In the case of the broadcast program information database 200 illustrated in FIG. 5, for a broadcast program whose event ID is "1", the broadcast program difference information generation unit 106 acquires "cast A" as the broadcast program difference information between the SD resolution layer (the layer ID=0) and the HD resolution layer (the layer ID=1).

In step S105, the broadcast program difference information generation unit 106 generates a broadcast program difference information database 300, in which the broadcast program difference information is added to the resolution layer identification information in the format illustrated in FIG. 6. In step S106, the broadcast program difference information generation unit 106 stores the broadcast program difference information database 300 generated in step S105 on the broadcast program information storage unit 107.

An exemplary flow of the broadcast program information screen control processing, which is executed by the broadcast program information screen control unit 108 illustrated in FIG. 4, will be described in detail below with reference to FIG. 8.

Figure 8:
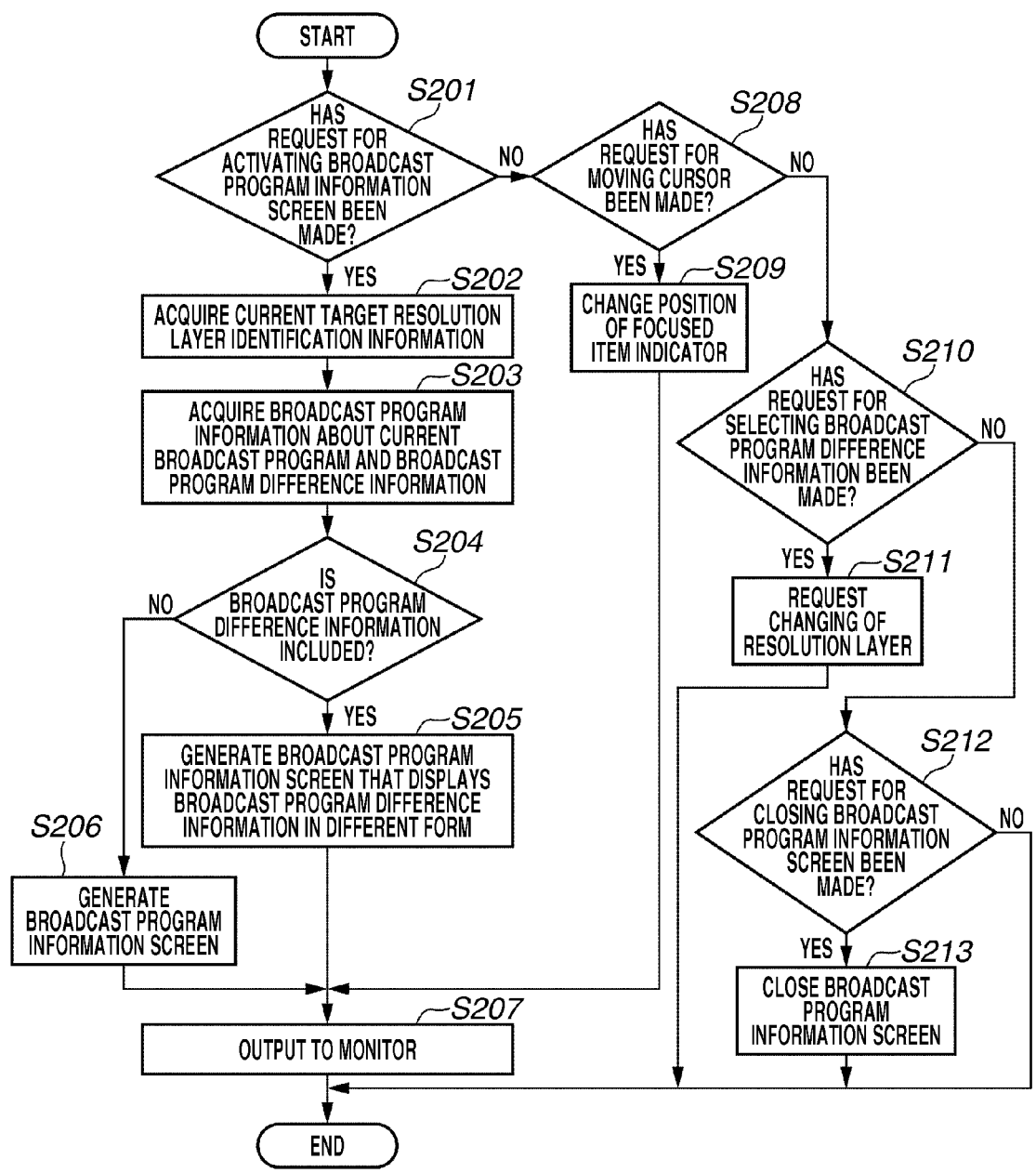
FIG. 8 is a flow chart illustrating an example of broadcast program information screen control processing executed by the content reception apparatus according to the first exemplary embodiment of the present invention.

Referring to FIG. 8, in step S201, the broadcast program information screen control unit 108 determines whether a request for activating the broadcast program information screen has been made from the I/F unit 111. If it is determined that a request for activating the broadcast program information screen has been made from the I/F unit 111 (YES in step S201), then the processing proceeds to step S202. On the other hand, if it is determined that no request for activating the broadcast program information screen has been made (NO in step S201), then the processing proceeds to step S208.

In step S202, the broadcast program information screen control unit 108 acquires the layer ID from the video decoding unit 104 as the identification information about the decode target resolution layer. In step S203, the broadcast program information screen control unit 108 acquires the broadcast program information and the broadcast program difference information about the decode target resolution layer for the currently displayed broadcast program from the broadcast program information storage unit 107.

In the example of the broadcast program information database 200 illustrated in FIG. 5, if the event ID of the currently displayed broadcast program is "1" and if the layer ID of the decode target resolution layer is "0", then the broadcast program information screen control unit 108 acquires "cast B", "cast C", and "cast D" as the broadcast program information.

In addition, in the example of the broadcast program difference information database 300 illustrated in FIG. 6, if the event ID of the currently displayed broadcast program is "1" and if the layer ID of the decode target resolution layer is "0", then the broadcast program information screen control unit 108 acquires "cast A" and "cast E" as the broadcast program difference information.

In step S204, the broadcast program information screen control unit 108 determines whether the broadcast program difference information has been acquired in step S203. If it is determined that the broadcast program difference information has been acquired (YES in step S204), then the processing proceeds to step S205. On the other hand, if it is determined that the broadcast program difference information has not been acquired yet (NO in step S204), then the processing proceeds to step S206.

In step S205, the broadcast program information screen control unit 108 generates a broadcast program information screen that represents the text string included in the broadcast program information acquired in step S203 and the text string included in the broadcast program difference information in mutually different formats.

Figure 9A:
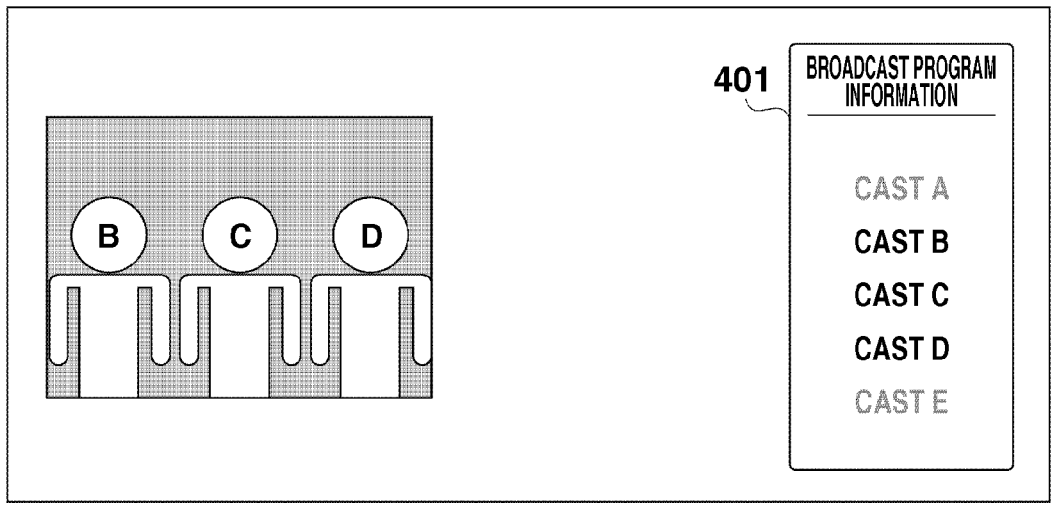
FIGS. 9A and 9B illustrate an example of a broadcast program information screen that displays broadcast program difference information, which is displayed by the content reception apparatus according to the first exemplary embodiment of the present invention.

In the example illustrated in FIG. 9A, a broadcast program information screen 401 displays the "cast A" and the "cast E", which are the text strings included in the broadcast program difference information, in italicized letters. On the other hand, the "cast B", the "cast C", and the "cast D", which are the text strings included in the broadcast program information, are represented in bold letters.

Any method can be used for representing the text string included in the broadcast program information and the text string included in the broadcast program difference information if the text strings can be identified from one another. More specifically, the text strings can be identified from one another by using different colors for the text string included in the broadcast program information and the text string included in the broadcast program difference information.

Figure 9B:
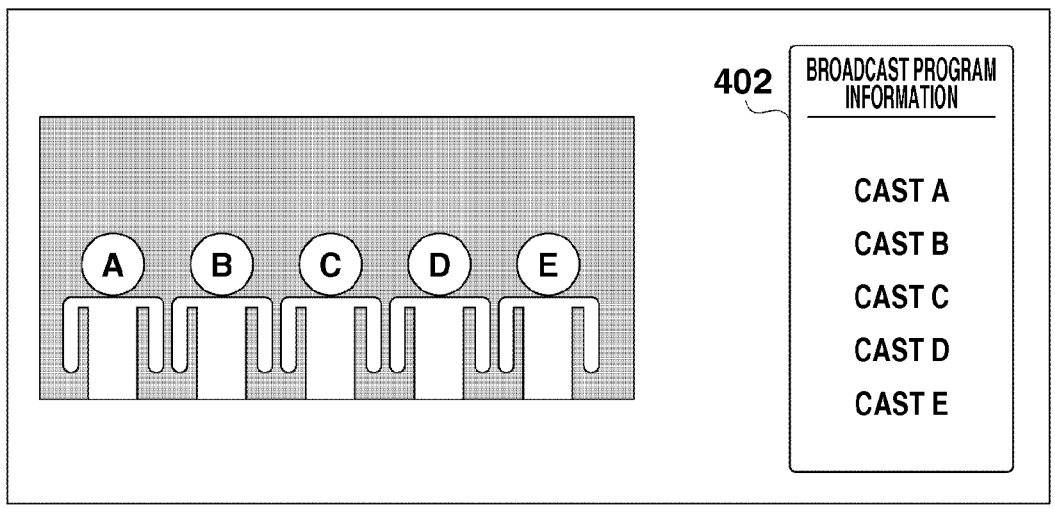

In step S206, the broadcast program information screen control unit 108 generates a broadcast program information screen by using the text string included in the broadcast program information acquired in step S203. More specifically, as indicated by the broadcast program information screen 402 in FIG. 9B, the broadcast program information screen control unit 108 generates a broadcast program information screen that represents all of the broadcast program information text strings "cast A", "cast B", "cast C", "cast D, and "cast E" in the same format.

In step S207, the broadcast program information screen control unit 108 outputs the broadcast program information screen generated in step S205 or S206 to the display combination unit 110. The broadcast program information screen output to the display combination unit 110 is combined with the video data decoded by the video decoding unit 104. Then, the combined screen and video data is output to the monitor 3.

In steps S208 through S213, an operation and processing to be executed when the broadcast program information is currently displayed is executed.

In step S208, the broadcast program information screen control unit 108 determines whether a cursor moving request has been made from the I/F unit 111. A focused item indicator 403 illustrated in the broadcast program information screen 401 illustrated in FIG. 11 displays a position of the focused item on the broadcast program difference information.

When a cursor moving request is received from the I/F unit 111, the broadcast program information screen control unit 108 changes the position of the focused item indicator 403. If it is determined that a cursor moving request has been made (YES in step S208), then the processing proceeds to step S209. On the other hand, if it is determined that if no cursor moving request has been made (NO in step S208), then the processing proceeds to step S210.

Figure 11:
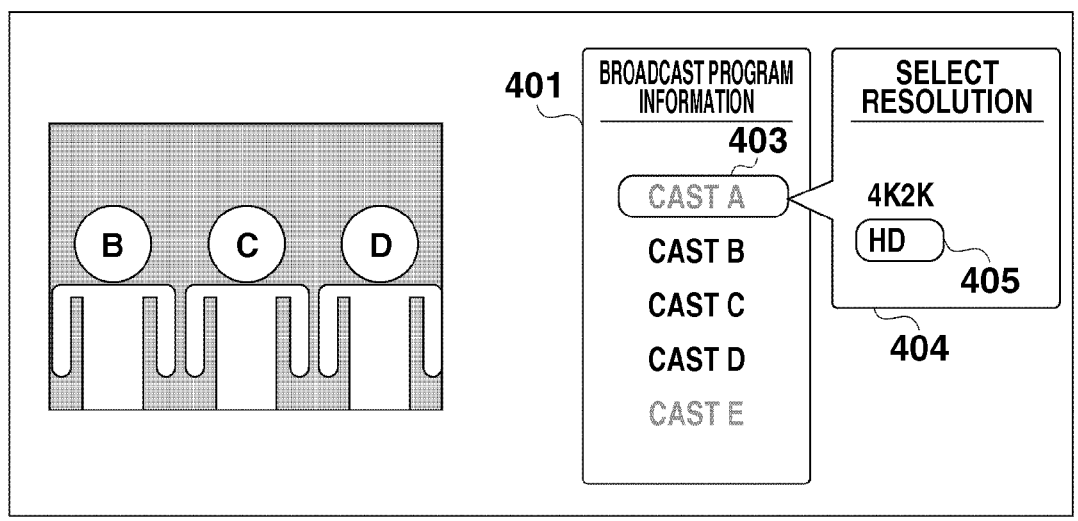
FIG. 11 illustrates an example of a broadcast program information screen, via which a user is allowed to select broadcast program difference information, and a resolution selection screen, via which the user is allowed to select a resolution, which are displayed by the content reception apparatus according to the first exemplary embodiment of the present invention.

In step S209, the broadcast program information screen control unit 108 changes the position of the focused item indicator 403 illustrated in FIG. 11 according to the cursor moving request from the I/F unit 111.

In the example of the broadcast program information screen 401 illustrated in FIG. 11, the broadcast program difference information, which is located below the "cast A", is the "cast E". Therefore, if a request for moving the cursor downwards from the I/F unit 111 has been made in a state where the focused item indicator 403 is focused on the "cast A", the broadcast program information screen control unit 108 changes the position of the focused item indicator 403 to the "cast E".

In step S210, the broadcast program information screen control unit 108 determines whether the broadcast program difference information has been selected by the user via the I/F unit 111. In the example of the broadcast program information screen 401 illustrated in FIG. 11, the broadcast program information screen control unit 108 determines that the user has selected the broadcast program difference information if the I/F unit 111 has made a request for finally input the broadcast program difference information when the focused item indicator 403 is positioned at the broadcast program difference information "cast A" or "cast E".

If it is determined that the broadcast program difference information has been selected (YES in step S210), then the processing proceeds to step S211. On the other hand, if it is determined that the broadcast program difference information has not been selected (NO in step S210), then the processing proceeds to step S212. In step S211, the broadcast program information screen control unit 108 requests the layer change control unit 109 of the change of the resolution layer.

In step S212, the broadcast program information screen control unit 108 determines whether a request for closing the broadcast program information screen has been made via the I/F unit 111. If it is determined that a request for closing the broadcast program information screen has been made (YES in step S212), then the processing proceeds to step S213. On the other hand, if it is determined that no request for closing the broadcast program information screen has been made (NO in step S212), then the broadcast program information screen control processing ends. In step S213, the broadcast program information screen control unit 108 makes a request to the display combination unit 110 for closing (discontinuing the display) of the broadcast program information screen.

Now, an exemplary flow of the layer change control processing executed by the layer change control unit 109 will be described in detail below with reference to the flow chart of FIG. 10.

Figure 10:
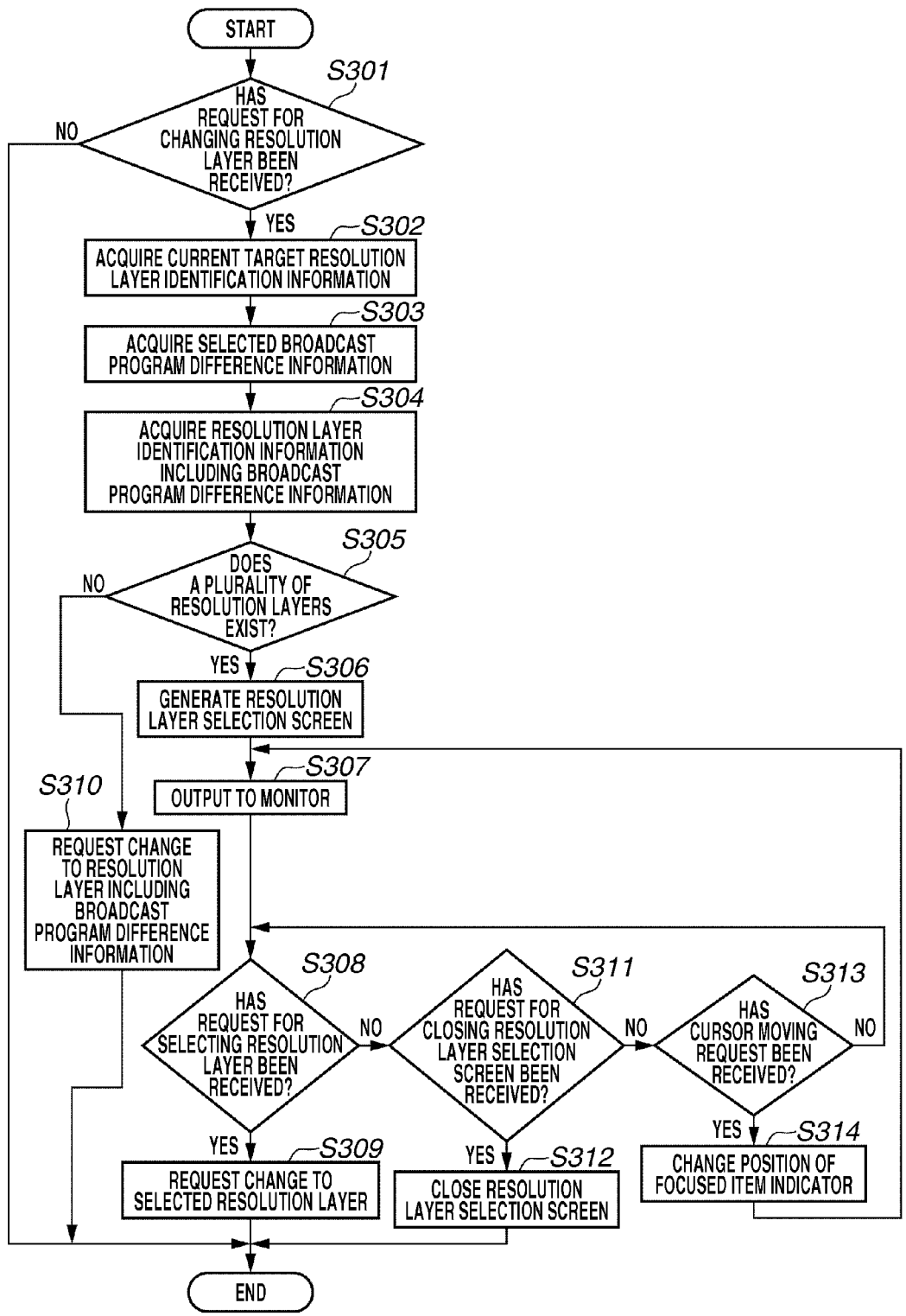
FIG. 10 is a flow chart illustrating an example of layer shift control processing executed by the content reception apparatus according to the first exemplary embodiment of the present invention.

Referring to FIG. 10, in step S301, the layer change control unit 109 determines whether a request for changing the resolution layer has been made from the broadcast program information screen control unit 108. If it is determined that a request for changing the resolution layer has been made (YES in step S301), then the processing proceeds to step S302. On the other hand, if it is determined that no request for changing the resolution layer has been made yet (NO in step S301), then the layer change control processing ends.

In step S302, the layer change control unit 109 acquires the layer ID of the decode target resolution layer from the video decoding unit 104. In step S303, the layer change control unit 109 acquires the broadcast program difference information selected by the broadcast program information screen control unit 108 therefrom.

In step S304, the layer change control unit 109 acquires the layer ID of the resolution layer including the broadcast program difference information and acquired in step S303 from the broadcast program difference information database stored on the broadcast program information storage unit 107. In step S304, the layer change control unit 109 acquires the layer ID of the resolution layer including the broadcast program difference information from within the resolution layer of the currently displayed broadcast program and whose decode target resolution layer is the resolution layer identified by the layer ID acquired in step S302.

In the broadcast program difference information database 300 (FIG. 6), if the event ID of the current broadcast program is "1", if the layer ID of the decode target resolution layer is "0", and if the broadcast program difference information is the "cast A", then the layer change control unit 109 acquires the layer IDs "1" and "2".

In step S305, the layer change control unit 109 determines whether a plurality of layer IDs of the resolution layers has been acquired in step S304. If it is determined that a plurality of layer IDs has been acquired (YES in step S305), then the processing proceeds to step S306. On the other hand, if it is determined that only one layer ID has been acquired (NO in step S305), then the processing proceeds to step S310.

In step S306, the layer change control unit 109 generates a resolution layer selection screen 404 illustrated in FIG. 11. In step S307, the layer change control unit 109 outputs the resolution layer selection screen generated in step S306 to the display combination unit 110. In addition, the layer change control unit 109 executes control for displaying the generated resolution layer selection screen on the monitor 3.

In step S308, the layer change control unit 109 determines whether the resolution layer has been selected via the resolution layer selection screen. In the resolution layer selection screen 404 illustrated in FIG. 12, if a request for finally inputting the selected resolution layer has been made from the I/F unit 111 in a state where a focused item indicator 405 is located at either the resolution layer "4K-2K" or "HD", the layer change control unit 109 determines that the resolution layer has been selected.

If it is determined that the resolution layer has been selected (YES in step S308), then the processing proceeds to step S309. On the other hand, if it is determined that the resolution layer has not been selected yet (NO in step S308), then the processing proceeds to step S311.

In step S309, the layer change control unit 109 makes a request to the video decoding unit 104 for changing the resolution layer to the resolution layer whose selection has been requested in step S308. In step S310, the layer change control unit 109 makes a request to the video decoding unit 104 for changing the resolution layer to the resolution layer identified by the layer ID acquired in step S304.

In step S311, if the resolution layer selection screen is currently displayed, the layer change control unit 109 determines whether a request for closing the resolution layer selection screen has been made from the I/F unit 111. If it is determined that a request for closing the resolution layer selection screen has been made (YES in step S311), then the processing proceeds to step S312. On the other hand, if it is determined that no resolution layer closing request has been made (NO in step S311), then the processing proceeds to step S313.

In step S312, the layer change control unit 109 makes a request to the display combination unit 110 for deleting the resolution layer selection screen.

In step S313, the layer change control unit 109 determines whether a cursor moving request has been made from the I/F unit 111. When a cursor moving request is received from the I/F unit 111, the layer change control unit 109 changes the position of the focused item indicator 405, which is displayed on the resolution layer selection screen 404 (FIG. 11). If it is determined that a cursor moving request has been made (YES in step S313), then the processing proceeds to step S314. On the other hand, if it is determined that no cursor moving request has been made (NO in step S313), then the processing returns to step S308.

In step S314, the layer change control unit 109 changes the position of the focused item indicator 405 (FIG. 11) according to the cursor moving request from the I/F unit 111. On the resolution layer selection screen 404 illustrated in FIG. 11, if it is requested by the I/F unit 111 to move the cursor upwards when the focused item indicator 405 is positioned on the resolution layer "HD", then the layer change control unit 109 changes the focused item indicator 405 to the resolution layer "4K-2K".

After changing the position of the focused item indicator 405 in step S314, then the processing proceeds to step S307. In step S307, the layer change control unit 109 outputs the resolution layer selection screen, on which the position of the focused item indicator 405 has been already changed, to the display combination unit 110.

In the present exemplary embodiment, the broadcast program difference information is presented to the user in the unit of a broadcast program. However, the broadcast program difference information can be presented to the user in the unit of a scene. In this case, instead of the above-described broadcast program information, broadcast program information added in the unit of a scene is used. Furthermore, instead of using an event ID, information for identifying a scene is used.

In the present exemplary embodiment, the broadcast program information screen is displayed according to the user operation. However, the broadcast program information screen including the broadcast program difference information can be displayed when the broadcast program information differs among the resolution layers.

In addition, in the present exemplary embodiment, the broadcast program information is added to each resolution layer of H.264/SVC. However, the present exemplary embodiment is not limited to this. More specifically, the present exemplary embodiment can be applied to all cases where a plurality of angles of view exists in a moving image or a still image, and if different metadata have been added to different angles of view.

More specifically, in a case where metadata is added to each trimmed image as discussed in Japanese Patent Application Laid-Open No. 2009-065635 also, if the user selects metadata of the trimmed image, the present exemplary embodiment can display the trimmed image including the selected metadata.

As described above, according to the first exemplary embodiment, if the broadcast program information differs among the resolution layers, the user is allowed to readily verify the broadcast program difference information among the resolution layers. In addition, by selecting the verified broadcast program difference information, the present exemplary embodiment can change the resolution layer to the resolution layer including the selected broadcast program difference information. With the above-described configuration, the present exemplary embodiment can prevent the user from overlooking the desired video. Accordingly, the present exemplary embodiment can improve the user's convenience.

As described above, in the first exemplary embodiment, the broadcast program difference information for the currently displayed broadcast program is presented to the user. In a second exemplary embodiment of the present invention, broadcast program difference information about a next scene is presented to the user in addition to the broadcast program difference information about the currently displayed broadcast program. In the present exemplary embodiment, a content reception apparatus 100 has the same configuration as that of the content reception apparatus 100 illustrated in FIG. 4 described above in the first exemplary embodiment.

FIG. 12 is a table illustrating an example of a broadcast program information database 500, which is stored on the broadcast program information storage unit 107 of the content reception apparatus 100 illustrated in FIG. 4.

Referring to FIG. 12, scene identification information 501 stores a scene ID as unique information for identifying a scene. In the present exemplary embodiment, a "scene" refers to one unit of a plurality of segments of a program.

A start time 502 stores a start time of the scene identified by the scene identification information 501. Resolution layer identification information 503 stores a layer ID as unique information for identifying the resolution layer as the resolution layer identification information 202 illustrated in FIG. 5.

The resolution layer identification information 503 is broadcast program information that describes a content of the scene identified by the scene identification information 501. The resolution layer identification information 503 stores the content similar to the content of the broadcast program information 203 illustrated in FIG. 5.

A table illustrated in FIG. 13 illustrates a broadcast program difference information database 600, which is stored on the broadcast program information storage unit 107 of the content reception apparatus 100 illustrated in FIG. 4.

Referring to FIG. 13, broadcast program identification information 601 stores a scene ID, similar to the scene identification information 501 illustrated in FIG. 12. Decode target resolution layer identification information 602 stores a layer ID as identification information for identifying the decode target resolution layer as the decode target resolution layer identification information 302 illustrated in FIG. 6.

Other resolution layer identification information 603 stores a layer ID as identification information for identifying the other resolution layer similar to the other resolution layer identification information 303 illustrated in FIG. 6. The broadcast program difference information 304 stores the broadcast program information that does not exists in the resolution layer identified by the decode target resolution layer identification information 602 but exists in the resolution layer identified by the resolution layer identification information 503, similar to the broadcast program difference information 304 illustrated in FIG. 6.

Now, the broadcast program information screen control processing executed by the broadcast program information screen control unit 108 will be described in detail below with reference to the flow chart of FIG. 14. Processing in steps S201 through S202 and processing in steps S204 through S213 is similar to corresponding processing illustrated in FIG. 5. Accordingly, the detailed description thereof will not be repeated here.

Referring to FIG. 14, in step S214, the broadcast program information screen control unit 108 acquires the broadcast program information and the broadcast program difference information of a current scene of a decode target resolution layer from the broadcast program information storage unit 107.

In the broadcast program information database 500 illustrated in FIG. 12, if the scene ID of the current scene is "1" and if the layer ID of the decode target resolution layer is "0", then the broadcast program information screen control unit 108 acquires "cast B", "cast C", and "cast D" as the broadcast program information. In addition, in the broadcast program difference information database 600 (FIG. 13), if the scene ID of the current scene is "1" and if the layer ID of the decode target resolution layer is "0", then the broadcast program information screen control unit 108 acquires "cast A" and "cast E" as the broadcast program difference information.

In step S215, the broadcast program information screen control unit 108 acquires the start time 502 of the next scene from the broadcast program information database 500 illustrated in FIG. 12 of the broadcast program information storage unit 107. In the broadcast program information database 500 illustrated in FIG. 12, if the scene ID of the next scene is "2", the broadcast program information screen control unit 108 acquires "8:00 p.m." as the start time.

In step S216, the broadcast program information screen control unit 108 calculates time difference between the present time and the start time of the next scene acquired in step S215.

The present time can be calculated based on JST_time, which is described by time offset table (TOT) transmitted by SI. The TOT refers to a table that describes information such as the present time. Similar to "start_time" described by EIT, the start time of the next scene is described in the section data acquired from the demultiplexer 102.

In step S217, the broadcast program information screen control unit 108 determines whether the time difference calculated in step S216 is equal to or less than a predetermined threshold value. In the present exemplary embodiment, a short period of time as short as three minutes or so is set as the predetermined threshold value. If it is determined that the time difference is not greater than the predetermined threshold value (NO in step S217), then the processing proceeds to step S219. On the other hand, if it is determined that the time difference is greater than the predetermined threshold value (YES in step S217), then the processing proceeds to step S218.

In step S218, the broadcast program information screen control unit 108 acquires the broadcast program information and the broadcast program difference information for the decode target resolution layer of the next scene from the broadcast program information storage unit 107.

In the broadcast program information database 500 illustrated in FIG. 12, if the scene ID of the next scene is "2" and if the layer ID of the decode target resolution layer is "0", the broadcast program information screen control unit 108 acquires "cast V", "cast W", and "cast X" as the broadcast program information. In addition, in the broadcast program difference information database 600 (FIG. 13), if the scene ID of the next scene is "2" and if the layer ID of the decode target resolution layer is "0", then the broadcast program information screen control unit 108 acquires "cast Y" and "cast Z" as the broadcast program difference information.

Figure 15:
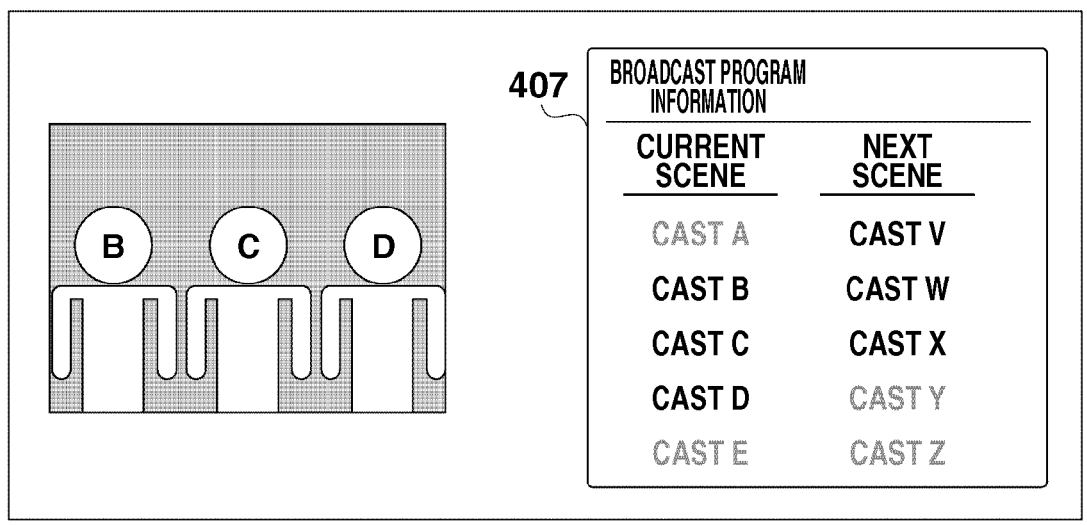
FIG. 15 illustrate an example of a broadcast program information screen that displays broadcast program difference information, which is displayed by the content reception apparatus according to the second exemplary embodiment of the present invention.

In step S219, the broadcast program information screen control unit 108 generates a broadcast program information screen, in mutually different formats, that represents the text string included in the broadcast program information and the text string of the broadcast program difference information acquired in steps S214 and S218. In step S219, the broadcast program information screen control unit 108 generates a broadcast program information screen 407, which represents the broadcast program information of the current scene and the next scene, and the broadcast program difference information therefor in mutually different formats as illustrated in FIG. 15.

As described above, as well as implementing the effect of the first exemplary embodiment described above, the present exemplary embodiment can implement a method in which the broadcast program difference information for the next scene is displayed together with the broadcast program difference information for the current scene if the time to the start of the next scene is short. Therefore, according to the present exemplary embodiment, it is enabled to previously shift to the video of the resolution layer including the broadcast program difference information for the next scene. Accordingly, the present exemplary embodiment can prevent the user from overlooking the desired video.

In the first and the second exemplary embodiments described above, the broadcast program information is added to each resolution layer of H.264/SVC. In a third exemplary embodiment of the present invention, broadcast program information for each resolution layer is generated and added according to a result of analysis on a video.

Now, an exemplary configuration of a content reception apparatus 700 according to the present exemplary embodiment will be described in detail below with reference to FIG. 16. The content reception apparatus 700 illustrated in FIG. 16 differs from the content reception apparatus 100 illustrated in FIG. 4 in the following point. More specifically, the content reception apparatus 700 includes a face image database 112 and an image analysis unit 113 in addition to the components of the content reception apparatus 100 illustrated in FIG. 4. In the example illustrated in FIG. 16, components of the content reception apparatus 700 similar to those of the content reception apparatus 100 illustrated in FIG. 4 have the same function as the function of those illustrated in FIG. 4 and are provided with the same reference numerals and symbols. Accordingly, the detailed description thereof will not be repeated here.

The face image database 112 stores a sample of a face image, to which the name of the person taken in the image has been added. The image analysis unit 113 extracts the person's name as a result of face recognition executed on all resolution layers of the video, which is received from the video decoding unit 104 in the unit of a frame. In addition, the image analysis unit 113 outputs the extracted person name to the broadcast program information decoding unit 105.

Furthermore, the image analysis unit 113 executes face detection on the video received from the video decoding unit 104 to extract a face image. In addition, the image analysis unit 113 executes comparison between the extracted face image and the sample of the face image acquired from the face image database as to the characteristics of the eyes and the mouth included in the two face images. If it is determined that the two face images have a similar characteristic as a result of the comparison, the image analysis unit 113 acquires the person's name that has been added to the face image sample.

The image analysis unit 113 adds the person's name acquired from the face image database 112 to the layer ID of the resolution layer acquired from the video decoding unit 104. In addition, the image analysis unit 113 outputs the layer ID to which the person's name has been added to the broadcast program information decoding unit 105.

The broadcast program information decoding unit 105 associates the layer ID, to which the person's name acquired from the image analysis unit 113 has been added, with the event ID of the current broadcast program extracted by the broadcast program information decoding unit 105, and generates the broadcast program information database 200 (FIG. 5) based on the mutually associated layer ID and the event ID.

In the present exemplary embodiment, the image analysis unit 113 extracts the person's name according to the result of the face recognition. However, the present exemplary embodiment is not limited to this. More specifically, the image analysis unit 113 can only extract the person's name according to extracted video characteristic information instead of a face recognition result.

As described above, the present exemplary embodiment is capable of extracting characteristic information about a video, such as a person's name, by analyzing the video. With the above-described configuration, the present exemplary embodiment can allow the user to verify the difference in the information included in the currently displayed video, and change the resolution layer to the resolution layer including the verified desired information even if no broadcast program information has been added to each resolution layer of H.264/SVC.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-263073 filed Nov. 18, 2009, which is hereby incorporated by reference herein in its entirety.

What is claimed is:
1. An image processing apparatus comprising:
a display unit which displays an image on a screen;
a decoding unit which decodes coded image data including a plurality of layers and generates image data of each layer;

an acquisition unit which acquires content information associated with the image data of each layer;

a determination unit which compares content information among each of a plurality of layers and determines whether content information which differs among each of the layers exists or not;

an extraction unit which extracts the content information which differs among each of the plurality of layers as first content difference information in a case where the determination unit determines that the content information which differs among each of the layers exists; and a control unit which generates a content information image including the content information associated with image data of each layer decoded by the decoding unit, unit; and a selection unit which selects the first content difference information included in the content information image generated by the control unit, wherein the control unit generates, in a case where the determination unit determines that there is a difference between the content information associated with image data of a first layer of the plurality of layers decoded by the decoding unit and the content information associated with image data of a second layer of the plurality of layers besides the first layer, a content information image in which the difference between the content information associated with the image data of the first layer and the content information associated with the image data of the second layer can be identified, and wherein the display unit displays the content information image generated by the control unit on the screen, wherein the control unit executes control of the decoding unit for decoding the image data of the layer including the selected first content difference information, if the first content difference information has been selected by the selection unit, wherein the first content difference information is difference information related to a person, and wherein the selection unit is capable of selecting a person and furthermore, after the selection, the selection unit is capable of selecting a resolution layer in which the person selected by the selection unit is included.

2. An image processing apparatus comprising:

displaying an image on a screen;

a decoding unit which decodes a coded image including a plurality of layers and to generate image data of each layer;

an acquisition unit which acquires characteristic information that indicates a content of the image data of each layer as content information by executing an analysis on an image included in image data of each layer decoded by the decoding unit;

a determination unit which compares content information among each of a plurality of layers and determines whether content information which differs among each of the layers exists or not;

an extraction unit which extracts the content information which differs among each of the plurality of layers as content difference information in a case where the determination unit determines that the content information which differs among each of the layers exists; and a control unit which generates a content information image that is an image indicating the content information associated with image data decoded by the decoding unit; and a selection unit which selects the first content difference information included in the content information image generated by the control unit, wherein the control unit generates, in a case where the determination unit determines that there is a difference between the content information associated with image data of a first layer of the plurality of layers decoded by the decoding unit and the content information associated with image data of a second layer of the plurality of layers besides the first layer, a content information image in which the difference between the content information associated with the image data of the first layer and the content information associated with the image data of the second layer can be identified, and wherein the displaying step displays the content information image generated by the control unit on the screen, wherein the control unit executes control of the decoding unit for decoding the image data of the layer including the selected first content difference information, if the first content difference information has been selected by the selection unit, wherein the first content difference information is difference information related to a person, and wherein the selection unit is capable of selecting a person and furthermore, after the selection, the selection unit is capable of selecting a resolution layer in which the person selected by the selection unit is included.

3. An image processing method comprising:

displaying an image on a screen;

decoding coded image data including a plurality of layers and generating image data of each layer;

acquiring content information associated with the image data of each layer;

comparing content information among each of a plurality of layers and determining whether content information which differs among each of the layers exists or not;

extracting the content information which differs among each of the plurality of layers as first content difference information in a case where the determining step determines that the content information which differs among each of the layers exists; and generating a content information image including the content information associated with image data of each layer decoded by the decoding step, step; and selecting the first content difference information included in the content information image generated by the generating step, wherein the generating step generates, in a case where the determining step determines that there is a difference between the content information associated with image data of a first layer of the plurality of layers decoded by the decoding step and the content information associated with image data of a second layer of the plurality of layers besides the first layer, a content information image in which the difference between the content information associated with the image data of the first layer and the content information associated with the image data of the second layer can be identified, and wherein the displaying step displays the content information image generated by the control unit on the screen, wherein the generating step executes control of the decoding step for decoding the image data of the layer including the selected first content difference information, if the first content difference information has been selected by the selecting step, wherein the first content difference information is difference information related to a person, and wherein the selecting step is capable of selecting a person and furthermore, after the selection, the selecting step selects a resolution layer in which the person selected by the selection unit is included.

4. An image processing method comprising:

displaying an image on a screen decoding a coded image including a plurality of layers and to generate image data of each layer;

acquiring characteristic information that indicates a content of the image data of each layer as content information by executing an analysis on an image included in image data of each layer decoded by the decoding step;

comparing content information among each of a plurality of layers and determining whether content information which differs among each of the layers exists or not;

extracting the content information which differs among each of the plurality of layers as content difference information in a case where the determining step determines that the content information which differs among each of the layers exists; and generating a content information image that is an image indicating the content information associated with image data decoded by the decoding step, step; and selecting the first content difference information included in the content information image generated by the generating step, wherein the generating step generates, in a case where the determining step determines that there is a difference between the content information associated with image data of a first layer of the plurality of layers decoded by the decoding step and the content information associated with image data of a second layer of the plurality of layers besides the first layer, a content information image in which the difference between the content information associated with the image data of the first layer and the content information associated with the image data of the second layer can be identified, and wherein the displaying step displays the content information image generated by the control unit on the screen, wherein the generating step executes control of the decoding step for decoding the image data of the layer including the selected first content difference information, if the first content difference information has been selected by the selecting step, wherein the first content difference information is difference information related to a person, and wherein the selecting step is capable of selecting a person and furthermore, after the selection, the selecting step selects a resolution layer in which the person selected by the selection unit is included.

5. The image processing apparatus according to claim 1, further comprising:

a determination unit which determines switch of a scene of the image data wherein the acquisition unit acquires content information associated with image data of each layer in next scene, wherein the extraction unit compares content information corresponding to each of a plurality of layers in the next scene and extract content information which differs between each of the plurality of layers in the next scene as second content difference information, and wherein the control unit generates, in a case where there is a difference between the content information associated with image data of a first layer of the plurality of layers decoded by the decoding unit and the content information associated with image data of a second layer of the plurality of layers besides the first layer, a content information image in which the content information associated with the image data of the first layer decoded by the decoding unit and the first content difference information can be identified from each other.

6. The image processing method according to claim 3, further comprising:

determining switch of a scene of the image data wherein the acquiring step acquires content information associated with image data of each layer in next scene, wherein the extracting step compares content information corresponding to each of a plurality of layers in the next scene and extract content information which differs between each of the plurality of layers in the next scene as second content difference information, and wherein the generating step generates, in a case where there is a difference between the content information associated with image data of a first layer of the plurality of layers decoded by the decoding step and the content information associated with image data of a second layer of the plurality of layers besides the first layer, a content information image in which the content information associated with the image data of the first layer decoded by the decoding step and the first content difference information can be identified from each other.

* * * * *